(12) United States Patent
Marquez Duran et al.

(10) Patent No.: US 10,793,197 B2
(45) Date of Patent: Oct. 6, 2020

(54) STRUCTURAL BEAM WITH COVER PLATE AND METHOD FOR MANUFACTURING

(71) Applicant: AUTOTECH ENGINEERING S.L., Amorebieta-Etxano (ES)

(72) Inventors: Sergi Marquez Duran, Rajadell (ES); Xavier Canales Larios, Vilanova I La Geltru (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 7 days.

(21) Appl. No.: 15/780,190

(22) PCT Filed: Dec. 16, 2016

(86) PCT No.: PCT/EP2016/081489
§ 371 (c)(1),
(2) Date: May 30, 2018

(87) PCT Pub. No.: WO2017/103148
PCT Pub. Date: Jun. 22, 2017

(65) Prior Publication Data
US 2019/0002028 A1     Jan. 3, 2019

(30) Foreign Application Priority Data

Dec. 18, 2015    (EP) ..................................... 15382644

(51) Int. Cl.
*B62D 25/04* (2006.01)
*B60R 19/18* (2006.01)
(Continued)

(52) U.S. Cl.
CPC .............. *B62D 25/04* (2013.01); *B60R 19/18* (2013.01); *B62D 25/00* (2013.01); *B62D 27/02* (2013.01);
(Continued)

(58) Field of Classification Search
CPC .......... B62D 25/04; B60R 19/18; B60R 19/03
(Continued)

(56) References Cited

U.S. PATENT DOCUMENTS

| 2010/0090481 A1 | 4/2010 | Nilsson | |
|---|---|---|---|
| 2011/0127802 A1* | 6/2011 | Kim | B62D 25/04 |
| | | | 296/203.03 |

(Continued)

FOREIGN PATENT DOCUMENTS

| DE | 102013017549 A1 | 4/2014 |
|---|---|---|
| EP | 2735620 A1 | 5/2014 |

(Continued)

OTHER PUBLICATIONS

International Search Report for PCT/EP2016/081489, dated Apr. 11, 2017.

*Primary Examiner* — Dennis H Pedder
(74) *Attorney, Agent, or Firm* — Squire Patton Boggs (US) LLP

(57) ABSTRACT

Structural beam which comprises a first beam and a cover plate to be attached to the first beam. The first beam has a substantially U-shaped cross-section along at least a first portion of its length. The U-shape comprises a bottom wall, two sidewalls, a lateral flange at an end of at least one of the two sidewalls, and a groove in the junction between the sidewall and the lateral flange. The groove has a substantially flat first joining region at or near the bottom of the groove. The cover plate of the structural beam has a substantially flat second joining region welded to a first joining region. Methods for manufacturing such beams are also provided.

18 Claims, 8 Drawing Sheets

(51) Int. Cl.
    *B62D 25/00*     (2006.01)
    *B62D 27/02*     (2006.01)
    *B23K 103/04*     (2006.01)
    *B23K 101/00*     (2006.01)
    *B23K 26/24*     (2014.01)

(52) U.S. Cl.
    CPC ........ *B23K 26/24* (2013.01); *B23K 2101/006* (2018.08); *B23K 2103/04* (2018.08); *B60R 2019/1813* (2013.01)

(58) Field of Classification Search
    USPC .................... 296/193.06, 29, 30; 293/102
    See application file for complete search history.

(56) References Cited

U.S. PATENT DOCUMENTS

2014/0117685 A1*   5/2014   Honda ................... B60R 19/18
                                                                   293/120
2015/0174702 A1*   6/2015   Fujimoto ............... B23K 26/60
                                                                   428/594

FOREIGN PATENT DOCUMENTS

| JP | 2010527848 A | 8/2010 |
|---|---|---|
| WO | WO 2015/071412 A1 | 5/2015 |

* cited by examiner

STRUCTURAL BEAM WITH COVER PLATE AND METHOD FOR MANUFACTURING

The present application claims the benefit and priority of EP 15382644.1, filed on Dec. 18, 2015. The present disclosure relates to structural beams, and in particular to structural beams incorporating a cover plate. The present disclosure also relates in particular to bumpers, B-pillars and A-pillars.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars.

The structural skeleton of a vehicle, e.g. a car, in this sense may include e.g. a bumper, pillars (A-pillar, B-pillar, C-pillar), side impact beams, a rocker panel, and shock absorbers. These components may incorporate a beam and additional plates around such a beam. Such beams may be manufactured in a variety of ways, and may be made of a variety of materials.

For the structural skeleton of a car, or at least for a number of its components, it has become commonplace in the automotive industry to use so-called Ultra High Strength Steels (UHSS), which exhibit an optimized maximal strength per weight unit and advantageous formability properties. UHSS may have an ultimate tensile strength of at least 1000 MPa, preferably approximately 1500 MPa or up to 2000 MPa or more.

An example of steel used in the automotive industry is 22MnB5 steel. The composition of 22MnB5 is summarized below in weight percentages (rest is iron (Fe) and impurities):

| C | Si | Mn | P | S |
|---|---|---|---|---|
| 0.20-0.25 | 0.15-0.35 | 1.10-1.35 | <0.025 | <0.008 |

| Cr | Ti | B | N |
|---|---|---|---|
| 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. In other examples the 22MnB5 may contain approximately 0.23% C, 0.22% Si, and 0.16% Cr. The material may further comprise Mn, Al, Ti, B, N, Ni in different proportions.

Usibor® 1500P commercially available from Arcelor Mittal, is an example of a commercially available 22MnB5 steel used in tailored and patchwork blanks. Tailor (welded) blanks and patchwork blanks provide a blank with varying thickness prior to a deformation process e.g. hot stamping. The thickness variation in a tailored blank is not to be confused with (local) reinforcement. Reinforcements in this sense instead are added to a component after a deformation process.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor® is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Various other steel compositions of UHSS may also be used in the automotive industry. Particularly, the steel compositions described in EP 2 735 620 A1 may be considered suitable. Specific reference may be had to table 1 and paragraphs 0016-0021 of EP 2 735 620, and to the considerations of paragraphs 0067-0079. In some examples, the UHSS may contain approximately 0.22% C, 1.2% Si, and 2.2% Mn.

Steel of any of these compositions (both 22MnB5 steel such as e.g. Usibor® and the other compositions mentioned or referred to before) may be supplied with a coating in order to prevent corrosion and oxidation damage. This coating may be e.g. an aluminum-silicon (AlSi) coating or a coating mainly comprising zinc or a zinc alloy.

In a B-pillar, an important problem is to ensure that no deformation or little deformation occurs in the middle region, as intrusion may cause damage to the vehicle occupants. A B-pillar may be made of UHSS, e.g. Usibor®, and may have zones of different thickness. Particularly, a central region (around half the height of the B-pillar) may be stronger (i.e. thicker) to avoid the aforementioned intrusion but the weight of the structure is therefore increased. Another solution applied in the middle region to avoid its deformation includes the addition of reinforcements but the weight of the structure is consequently increased.

A B-pillar may further comprise a soft zone in the lower part of the B-pillar central beam, which possesses less stiffness than the central region. This is so as to concentrate energy dissipation far away from central region, and to control the kinematics of deformation. Thus, the central region remains without deformation and the soft zone is deformed.

A B-pillar in some examples may comprise a central beam, an external plate and an internal plate (or cover plate), and optionally a further central reinforcement (central herein means in between the external and internal plate). The internal plate may serve for attaching parts to the interior of the vehicle, e.g. a car. The external plate may serve particularly for providing a complementary shape to a car door.

In the case of cover plates, these may be welded to the B-pillar by spot welding.

Spot welding joins two metal pieces together using two electrodes which make a high intensity welding current go through both pieces at a concentrated area (or spot), melting the material in that point and forming the weld. This technique, however, has some disadvantages such us the impossibility of forming a continuous weld or the possible difficulty of welding certain regions or pieces due to the laborious access to the welding point. This technique requires a flat portion (in which the first beam and the cover plate are welded together) over a width of about 15 mm.

On the other hand, automotive companies try to reduce the weight of the car as much as possible, as a heavier vehicle involves not only higher manufacturing costs but also increased fuel consumption, greater difficulty when accelerating, braking and/or turning due to the high inertia of a large mass.

In conclusion, there is a need for improving the mechanical behavior of structural skeleton of vehicles in crash events while at the same time reducing as much as possible the weight of the same skeleton.

SUMMARY

In a first aspect, a structural beam comprising a first beam and a cover plate to be attached to the first beam are provided. The first beam has a substantially U-shaped cross-section along at least a first portion of its length. This U-shape comprises a bottom wall and two sidewalls. The mentioned cross-section further comprises an outwardly projecting lateral flange at an end of at least one of the two sidewalls, and a groove in a junction between the sidewall and the outwardly projecting lateral flange. The groove has a first joining region at or near the bottom of the groove which is substantially flat. The cover plate of the structural beam has a substantially flat second joining region. The cover plate is welded to the first beam at first and second joining regions. The first joining region and the second joining region have a width of about 2-10 mm.

The use of a substantially U-shaped cross-section and the grooves between the flanges and the U-shape permits a better behavior under bending forces as the moment of inertia around the relevant axis is increased. The incorporation of the flat joining regions, in both the grooves and the cover plate, enables the welding at the grooves. Whereas in prior art arrangements, cover plates were usually welded at the flanges, the width of the cover plate can be reduced if they are joined at the grooves. This can reduce the weight of the cover plate (and of the resulting beam), while practically maintaining the same performance in case of an impact or collision.

Furthermore, having the first and second joining regions of a width of about 2-10 mm enables welding the cover plate at first beam groove, that is, flanges are not required for welding purposes. As no extra material is added to manufacture the flanges, a weight reduction is achieved.

In some examples, the structural beam comprises an outwardly projecting lateral flange at an end of each of the two sidewalls, and a groove in the junction between the sidewalls and each outwardly projecting lateral flange, each groove having a first joining region at or near the bottom of the groove, the first joining region being substantially flat.

In some examples, the structural beam further comprises a groove at the bottom wall of the U-shape.

In some examples, the structural beam further comprises at least a transition zone in at least one of the sidewalls of the U-shape.

According to a further example, the cover plate may extend along nearly the entire length of the first beam and in this way it forms a closed structure together with the first beam. The advantage of a closed structure is an increased torsional stiffness, and therefore a reinforced structure is created.

In some examples, the cover plate may be laser welded to the first beam.

According to another example, the cover plate is welded to the first beam by laser welding. As compared to spot welding, laser welding permits continuous welding and therefore the chance of forming closed structures. Laser welding also makes the weight reduction easier as the minimum joining width required can be lower than for spot welding, i.e. 2 millimeters in contrast to the 15 needed in spot welding.

As a smaller flat region is needed in the first beam and the cover plate, joining the cover plate to the first beam is possible without having to amend e.g. the shape of the groove. The use of a smaller flat region also improves the inertia of a U-shaped cross-section beam without changing its weight.

Another aspect of laser welding is the ability to weld at regions with difficult access as just one instrument is used when welding, in contrast to the two electrodes of spot welding.

In some examples, the first beam may be made of 22MnB5 steel.

According to some examples, the structural beam may be part of a B-pillar.

According to other examples the structural beam may be part of an A-pillar.

According to further examples the structural beam may be part of a bumper.

In a second aspect, a method for manufacturing a structural beam for vehicles is disclosed. Firstly a first beam and a cover plate according to any of the examples disclosed herein are provided. Then, the first beam and the cover plate are welded at the first and second joining regions.

In some examples, the welding comprises laser welding. In other examples, laser welding may be remote laser welding.

In some examples, providing a first beam and a cover plate may comprise hot stamping the first beam and/or the cover plate.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
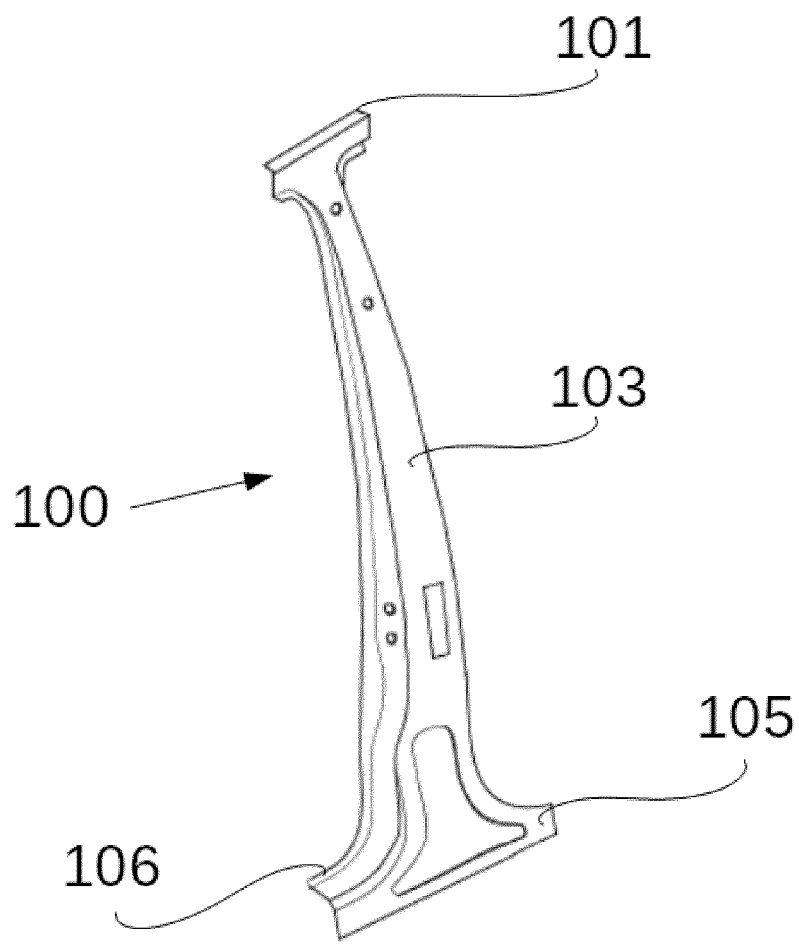
FIG. 1 illustrates a common B-pillar central beam.

FIG. 1 depicts a B-pillar central beam 100 which is, as a rule, welded to the rocker at the lower part 105, and to the roof panel of a vehicle, e.g. a car, in the upper part 101. It is situated between the front and rear seats of the vehicle and it is useful to for different purposes. As said before, it gives structural support to the skeleton of the vehicle and provides a security barrier in a vehicle crash.

A B-pillar in some examples may comprise a first beam (or central beam), an external plate and an internal plate (or cover plate). The cover plate may serve for attaching parts to the interior of the vehicle, e.g. a car. The external plate may serve particularly for providing a complementary shape to a car door. Both a cover plate and an external plate, depending on the specific implementation, may contribute to the structural strength and stiffness of the resulting B-pillar.

Besides, a B-pillar central beam is also used as mooring for many elements which are anchored in holes provided for each purpose. The B-pillar central beam 100 of FIG. 1 may have a hole to mount the anchor of the seatbelt, and another hole where a door lock may be placed. A B-pillar central beam may further disclose fastening holes of different shapes and sizes e.g. to attach plastic furnishings or linings of the internal vehicle structures. FIG. 1 further depicts flanges 106 that project outwardly.

The central part 103 of the B-pillar central beam is the most critical part in a vehicle lateral crash. The impact may cause an intrusion in the structure which may cause damage in vehicle occupants. It is therefore important to ensure that no deformation occurs in such central region 103 and consequently the zone is reinforced or stiffened.

Figure 2A:
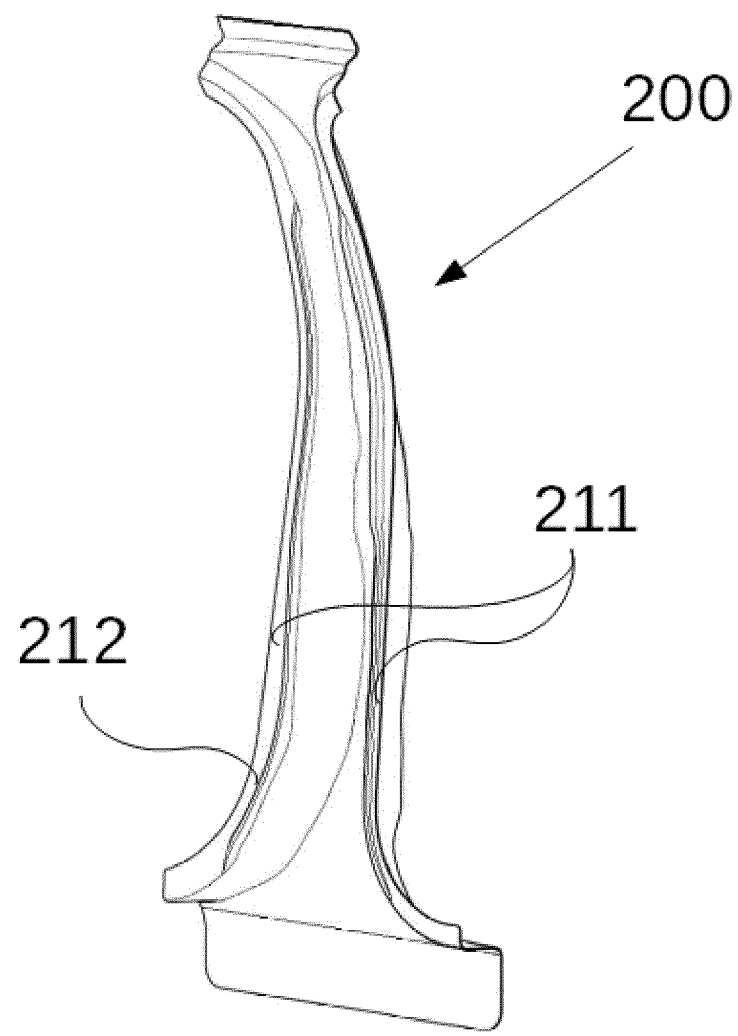
FIG. 2a illustrates a rear view of a B-pillar central beam.

In FIG. 2a, a rear view of a B-pillar central beam is shown. The B-pillar central beam 200 has flanges 211 that project outwardly and a groove 212.

Figure 2B:
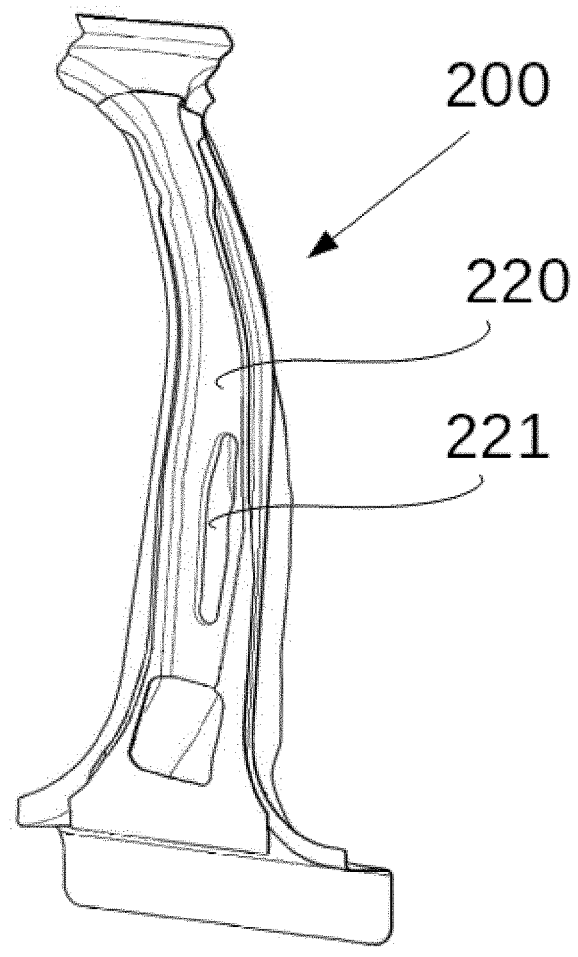
FIGS. 2b and 2c illustrate a rear view of example of B-pillar central beams with one or more cover plates.

A central beam and a cover plate may be welded together, and as the laser welding enables a continuous junction, both pieces may form a closed structure. A tubular entity resists twisting or torsional forces better and therefore may be interesting for a structure such as a B-pillar. An example is depicted in FIG. 2b in which a B-pillar central beam 200 and a cover plate 220 are welded to form a closed structure. As shown in the example, a cover plate may also comprise holes 221 for e.g. weight reduction or the enable access to the door lock.

Figure 2C:
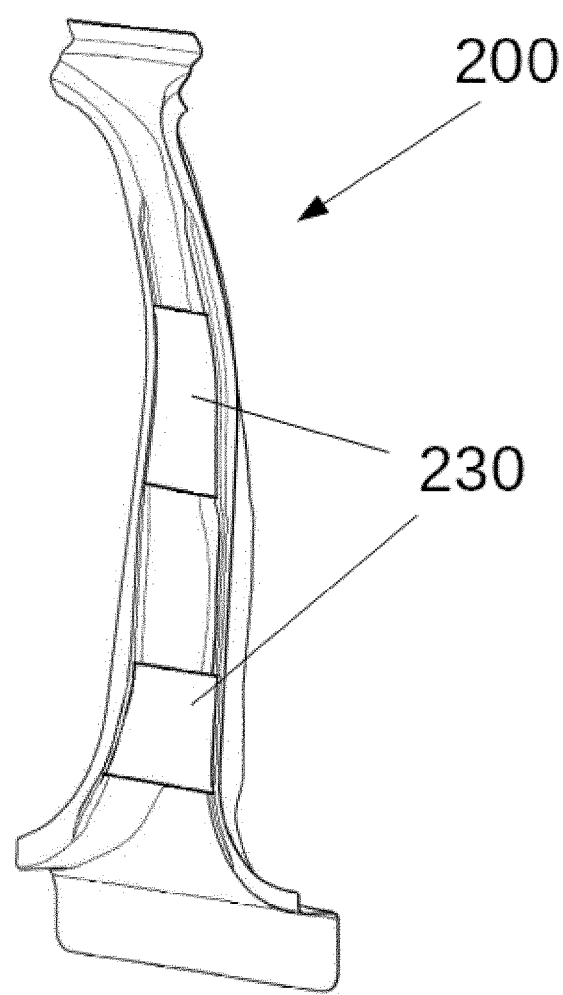

On the other hand, locally placed cover plates may be welded to the central beam of the structure, e.g. a B-pillar, in different regions over a portion of the length of e.g. a B-pillar central beam. In this way a closed structure may not be formed but specific areas may be strengthened. An example may be found in FIG. 2c in which two cover plates 230 are welded to a B-pillar central beam 200 stiffening its central and lower part.

An effect of locally placed cover plates is the reduction of material used for strengthening the structure and therefore manufacturing costs are saved. Another effect of locally placed cover plates is the weight reduction not only compared to previous welding technique but also compared to an example in which the cover plate is extended over nearly the entire length of a B-pillar central beam, as shown in FIG. 2b.

Figure 3:
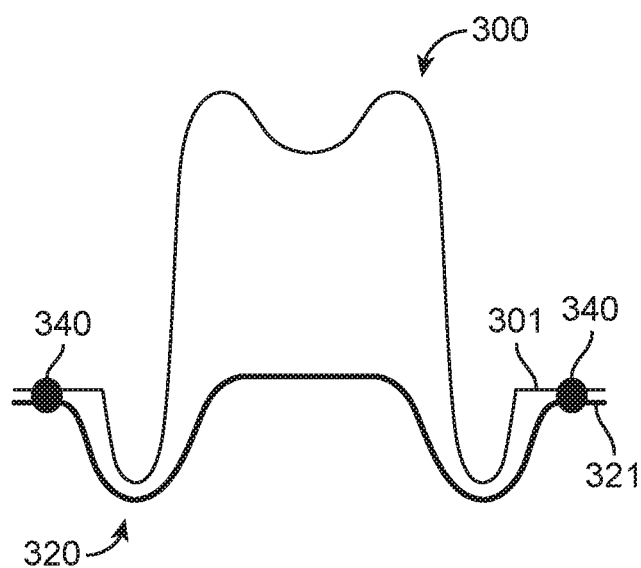
FIG. 3 illustrates a structural beam welded according to prior art.

In FIG. 3, a cover plate 320 and a B-pillar central beam 300 are schematically shown according to a prior art arrangement. In the Figure, both elements are provided with horizontal flanges 301, 321 that project outwardly. The cover plate is attached at the flanges, using spot welding at welding points 340. The cover plate 320 is attached at the flanges, since the spot welding requires access and approximately 30 mm of flat surface, which are only available at the flanges.

Figure 4:
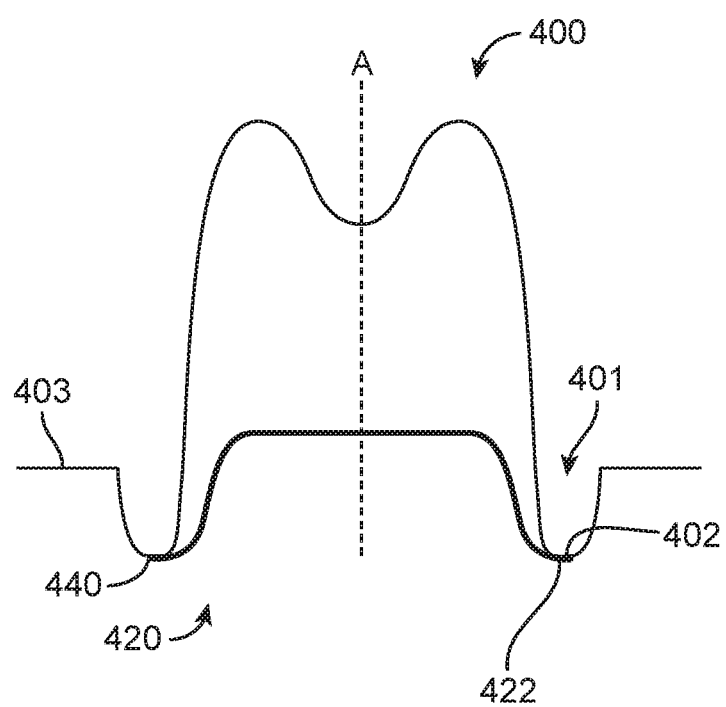
FIG. 4 illustrates a structural beam welded in an example.

FIG. 4 schematically depicts an example wherein a B-pillar central beam 400 and a cover plate 420 are welded according to an example of the present disclosure. The B-pillar central beam 400 may have a cross-section with an overall U-shape to face bending forces at least along a portion of its length. The U-shape comprises flanges 403 projected outwardly and grooves 401 with a substantially flat portion 402 at the junction between the sidewalls of the U-shape and the flanges. The cover plate 420 may have a flat portion 422 where a welding zone 440 may be located.

As depicted in FIG. 4, the cover plate 420 and the B-pillar central beam 400 may be joined in a region closer to the center of the structure represented by the A axis, unlike in the example of FIG. 3, in which the B-pillar central beam 300 and cover plate 320 are welded in flanges, in the outer region of the structure. The cover plate 420 shown in FIG. 4 therefore may not need flanges and the B-pillar central beam 400 possesses a flat region 402 big enough to enable the welding, and in particular laser welding, or more preferably, remote laser welding.

Joining a central beam and a cover plate in examples of the present disclosure may be based on laser welding instead of spot welding. Laser welding techniques are used to join metal pieces together by melting and crystallizing the metal. Additionally, a protector gas to avoid the creation of oxygen bubbles in the junction may be used.

Laser welding can be easily automatized i.e. involving an increase in speed and precision, and it generally does not need the addition of extra (filler) material because the melted metal is the base for the junction. It also allows continuous welding without creation of pores in the weld.

On the other hand, laser welding also allows the creation of discontinuous welds formed of a plurality of welds. Such discontinuous welds may have a minimum length of 10 mm, preferably a minimum of 30 mm.

Examples of present disclosure may preferably weld both a cover plate and a central beam of the structural beam by remote laser welding. Remote laser welding process is characterized by a long focal length (up to 1600 mm), a high-power and laser source, and beam deflection by the scanner. Compared to conventional laser welding, remote welding technology offers an increased flexibility (as greater number of process parameters may be taken into account), higher working speed, reduced number of clamping and reduced cycle time.

Remote laser welding is normally based on using a scanner to deflect and position the laser beam onto the surface of the work piece travelling at high speed and, at present, 3D-scanners are the most widely adopted scanners in remote welding applications, although 2D-scanners may also be used. The scanner unit may be a galvanometer system, in which mobile mirrors are used and rotated by motors for guiding the laser beam. The scanner unit may be guided onto the surface of the work piece in conjunction with a robot.

Optionally, the movements of the scanner unit and the robot may be synchronized in real time for reducing non-productive repositioning time from one weld seam to the following weld seam. This configuration is commonly known as "welding on the fly". In "welding on the fly" configurations, the robot has a large working area, while the scanner unit provides high-speed and precise movements.

Optionally, the remote laser welding system may incorporate a seam tracking system, for increasing the positioning accuracy. Seam tracking systems are used in fillet welding configurations, since fillet welding configurations are more sensitive to position errors than overlap joints. Therefore, the weld seam may be further reduced.

In some configurations welding on the fly and seam tracking systems may be combined.

As previously mentioned, laser welding can improve the results over spot welding, because, the minimum flat surface required for laser welding is considerably less i.e. over a width of about 2 mm perpendicular to welding direction, compared to spot welding which requires a minimum width of 15 mm. In the case of remote laser welding, fillet welding with seam tracking can be used. Therefore, a small flat region may be created in the groove of the B-pillar central beam structure suitable for laser welding which may be at least 2 mm, and preferably between 3 and 10 mm.

As a result, a weight reduction may be achieved in the example of FIG. 4, since less material is needed for the cover plate 420. As no flanges may be needed in the cover plate 420 the overall weight of a vehicle e.g. a car, may be reduced in some cases by about 1 kilogram, about 400 grams in each B-pillar, compared to the previous practice. The reduction is far from negligible, as automotive companies seek weight reduction however small it may be.

Figure 5A:
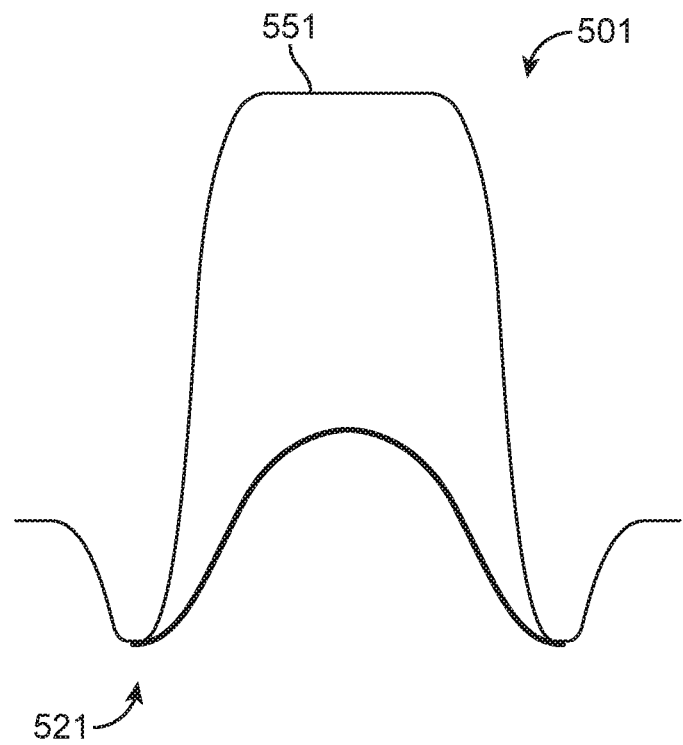
FIGS. 5a and 5b illustrate examples of different shapes for the first beam and cover plates of the structure according to examples of a B-pillar.
Figure 5B:
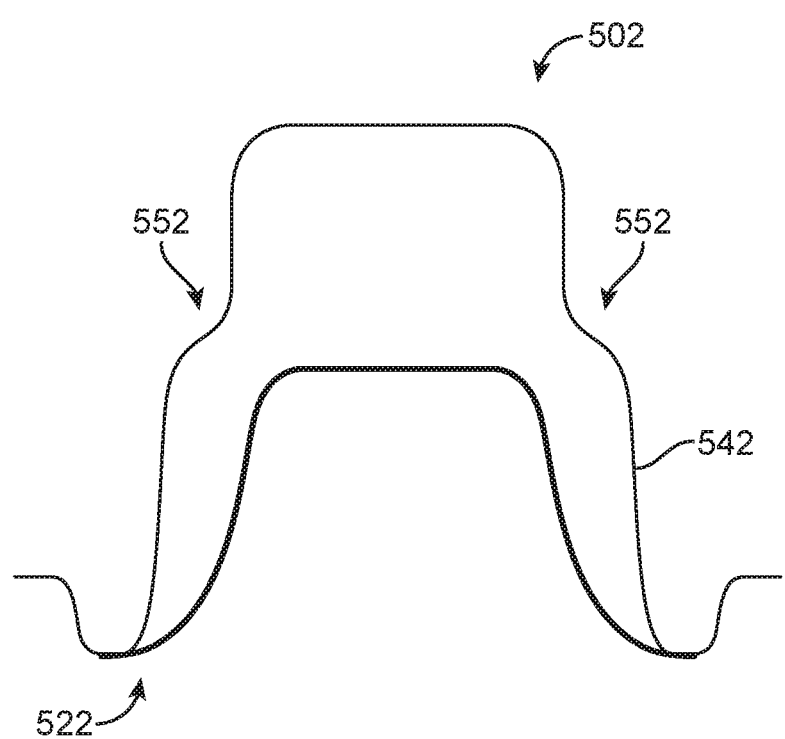

FIGS. 5a and 5b depict different cross-section examples of a structural beam central beam 501, 502, and cover plate 521, 522, according to other examples of the present disclosure.

FIG. 5a shows an example wherein the U-shaped cross-section of the central beam 501, in this example a B-pillar central beam, comprises a flat bottom wall 551. The example further comprises a cover plate 521 with a substantially curved cross-section. FIG. 5b shows an example wherein each of the sidewalls 542 of the central beam 502 cross-section, in this example B-pillar central beam, are provided with a transition zone 552 which may reduce the buckling. FIG. 5b further comprises a cover plate 522 which cross-section is substantially curved in its central area and comprises a flat bottom wall.

Figure 6A:
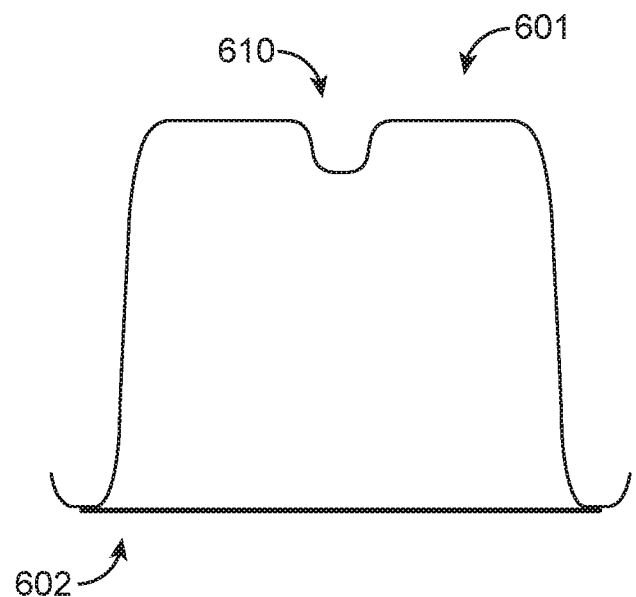
FIGS. 6a and 6b illustrate examples of different shapes for the first beam and the cover plate of the structure according to examples of a bumper.
Figure 6B:
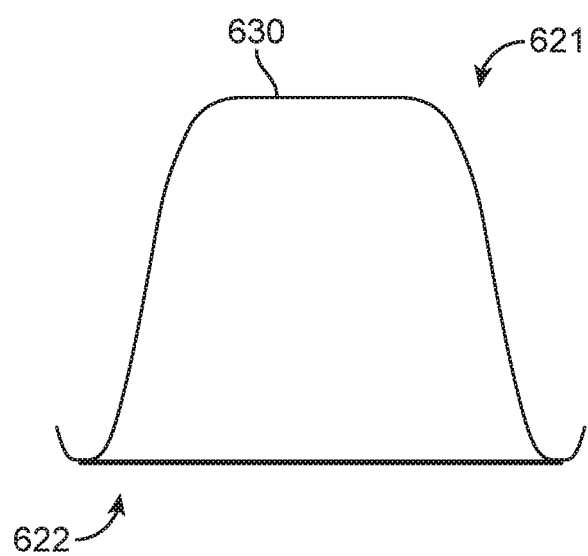

FIGS. 6a and 6b depict different cross-section examples of a structural beam first beam 601, 621 and cover plate 602, 622 according to other examples of the present disclosure.

FIG. 6a depicts an example wherein the U-shaped cross-section of the first beam 601 which is part of a bumper. In some examples a bumper may comprise a first beam (or bumper beam) and a cover plate. The cross-section of the first beam 601 is provided with a groove 610 in its bottom wall and the cover plate 602 has a completely flat cross-section. Finally, FIG. 6b shows another example of a bumper in which the U-shaped cross-section of the first beam 621 has a rounded bottom wall 630 and the cross-section of the cover plate 622 is completely flat.

In other examples the structural beam may be part of an A-pillar.

Figure 7:
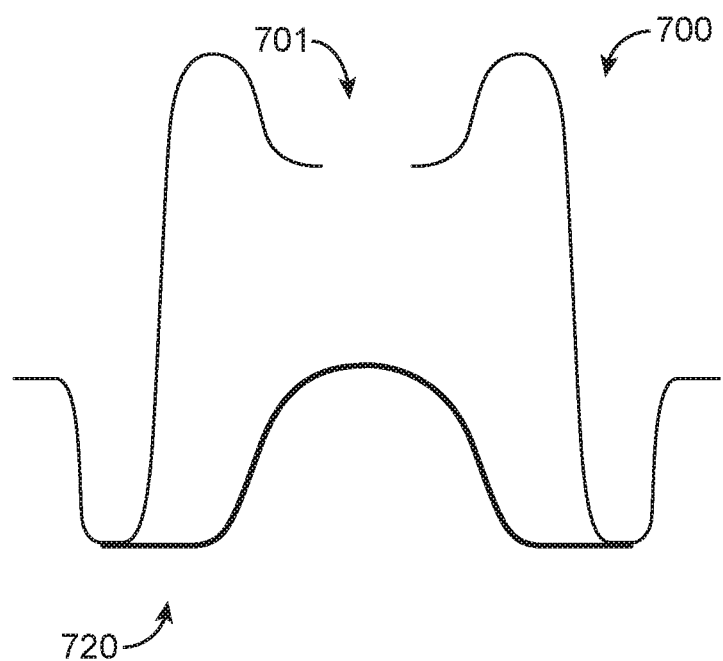
FIG. 7 illustrates an example of a possible configuration of the structural beam in a region where the first beam has a hole.

As previously mentioned, a B-pillar central beam may have holes e.g. for the seatbelt anchor or for the door lock, hence a possible configuration for these regions is shown in the example of FIG. 7. In the example, the B-pillar central beam 700 may have a hole 701 in the center of its bottom wall and the cover plate 720 may have a particular shape to compensate the presence of a hole, are depicted.

Figure 8:
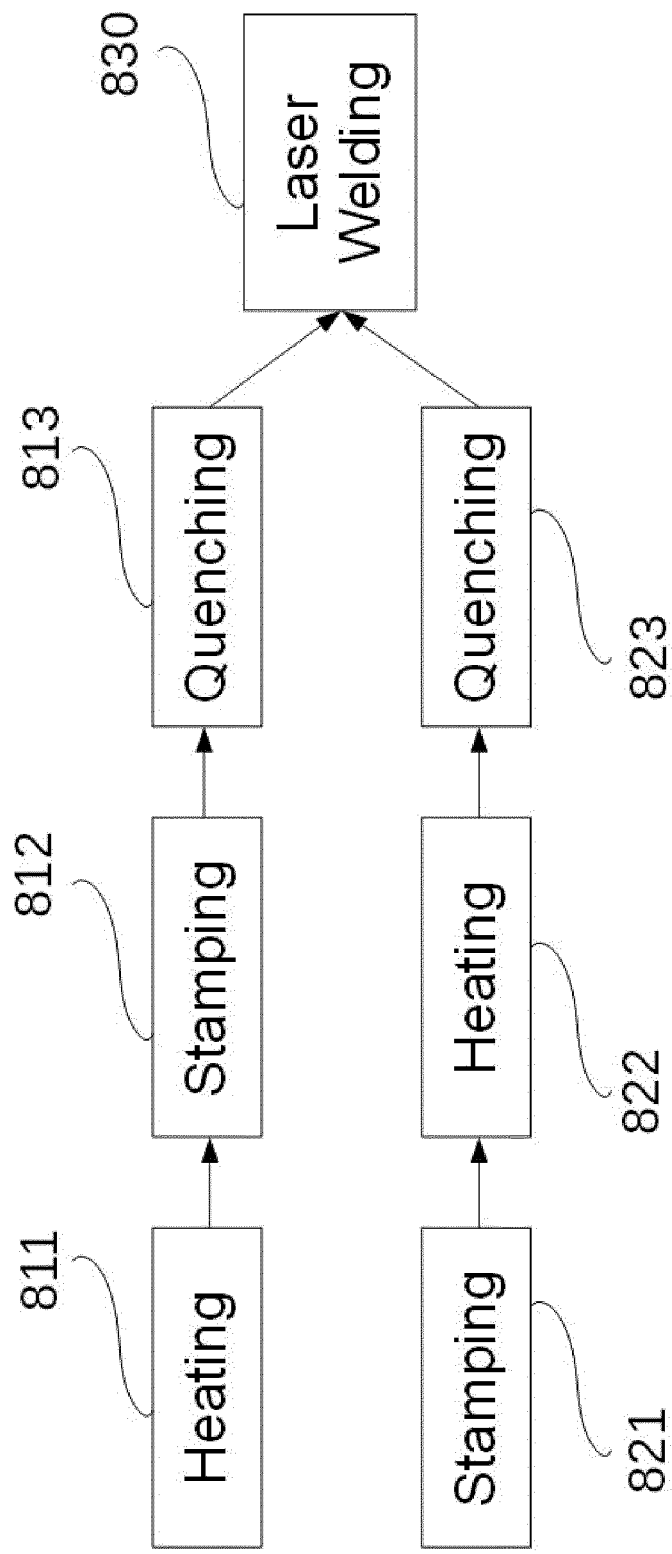
FIG. 8 schematically illustrates an example of a possible method for manufacturing a structural beam.

Structural beam first beam and cover plate may be manufactured separately by e.g. hot stamping. FIG. 8 schematically depicts a method according to an example of the present disclosure. The method comprises two parallel processes in which structural beam first beam is manufactured by hot stamping while the cover plate is manufactured by cold stamping and then, the first beam and the cover plate are welded together.

The first step of the method for manufacturing a structural beam first beam by a hot stamping process consists on heating 811 a steel blank in a furnace, e.g. to a temperature between 900° C. and 950° C. Then, the blank is stamped 812 (while it is still hot) to obtain the desired shape. Finally, the blank is quenched 813. The cover plate may be manufactured by the same process or by cold stamping, as shown in FIG. 8. Cold forming involves the transformation of a sheet of metal at room temperature inside a forming die under pressure 821. The metal sheet is afterwards heated 822 and quenched 823 to get a hardened piece. When the first beam and the cover plate have been manufactured, they may be welded 830 together e.g. by laser welding.

The cover plate may be also manufactured by hot stamping process (not shown). A steel blank may be heated in a furnace, it may be stamped while it is still hot and finally quenched. When both parts have been manufactured, they may be welded together e.g. by laser welding.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A structural beam comprising:
a first beam and a cover plate configured to be attached to the first beam,
the first beam having
a cross-section with a substantially U-shape along at least a first portion of its length, the U-shape including a bottom wall, and two sidewalls, and wherein
the cross-section further comprises an outwardly projecting lateral flange at an end of one of the two sidewalls, and a groove in a junction between the sidewall and the outwardly projecting lateral flange, wherein
the groove has a first joining region at a bottom of the groove,
the first joining region being substantially flat, the outwardly projecting lateral flange extending from the groove further in a direction that is substantially parallel to the first joining region than in a direction that is substantially perpendicular to the first joining region, and
the cover plate having a substantially flat second joining region wherein the cover plate is welded to the first beam at the first and second joining regions, wherein the first joining region and the second joining region have a width of about 2-10 mm, and wherein an edge of the cover plate located at a terminating end of the flat second joining region does not extend beyond the first joining region located at the bottom of the groove between the side wall and the outwardly projecting lateral flange of the first beam.

2. The structural beam according to claim 1, further comprising:
a second outwardly projecting lateral flange at an end of the other sidewall, each of the flanges being at the end of its respective sidewall, and
a second groove in a junction between the second outwardly projecting lateral flange and its respective sidewall, each groove having the first joining region at the bottom of the groove, the first joining region being substantially flat,
wherein a width of the first beam measured along a lateral direction from an end of the outwardly projecting lateral flange to an end of the second outwardly projecting lateral flange is greater than a width of the cover plate measured along the same lateral direction.

3. The structural beam according to claim 1, further comprising a groove at the bottom wall of the U-shape.

4. The structural beam according to claim 1, further comprising at least a transition zone in at least one of the sidewalls of the U-shape.

5. The structural beam according to claim 1, wherein the cover plate extends along nearly the entire length of the first beam and forms a closed structure together with the first beam.

6. The structural beam according to claim 1, wherein the cover plate is laser welded to the first beam.

7. The structural beam according to claim 1, wherein the first beam is made of 22MnB5 steel.

8. A method for manufacturing a structural beam for vehicles, the method comprising:
   stamping a first beam and a cover plate configured to be attached to the first beam, wherein the first beam has a substantially U-shaped cross-section along at least a first portion of its length,
      the U-shape comprising a bottom wall, and two sidewalls,
      the U-shape further comprising an outwardly projecting lateral flange at an end of at least one of the two sidewalls, and a groove in a junction between the sidewall and the outwardly projecting lateral flange, wherein,
         the groove has a first joining region at a bottom of the groove,
         the first joining region being substantially flat, the outwardly projecting lateral flange extending from the groove further in a direction that is substantially parallel to the first joining region than in a direction that is substantially perpendicular to the first joining region,
   and the cover plate having a substantially flat second joining region, wherein the first joining region and the second joining region have a width of about 2-10 mm; and
   welding the first beam and the cover plate at the first and second joining regions, and wherein an edge of the cover plate located at a terminating end of the flat second joining region does not extend beyond the first joining region located at the bottom of the groove between the side wall and the outwardly projecting lateral flange of the first beam.

9. The method according to claim 8, wherein the welding comprises laser welding.

10. The method according to claim 9, wherein the laser welding is remote laser welding.

11. The method according to claim 8, wherein providing a first beam and a cover plate comprises hot stamping one or both of the first beam and the cover plate.

12. The structural beam according to claim 1, wherein the cover plate comprises a segment having a curved cross-section.

13. The structural beam according to claim 1, wherein the cover plate comprise a cross-section comprising a curved central area and a flat bottom wall.

14. The structural beam according to claim 1, wherein the cover plate is a flat plate, with no bends or curvature.

15. The structural beam according to claim 1, wherein the first joining region and the second joining region have a width of 3-10 mm.

16. The structural beam according to claim 8, wherein the first joining region and the second joining region have a width of 3-10 mm.

17. The structural beam according to claim 1, wherein the edge of the cover plate terminates at the groove such that the outwardly projecting lateral flange extends laterally beyond the edge of the cover plate.

18. The method according to claim 8, wherein the edge of the cover plate terminates at the groove such that the outwardly projecting lateral flange extends laterally beyond the edge of the cover plate.

* * * * *